(12) United States Patent
Kottomtharayil

(10) Patent No.: US 12,105,598 B2
(45) Date of Patent: *Oct. 1, 2024

(54) DATA PROTECTION SCHEDULING, SUCH AS PROVIDING A FLEXIBLE BACKUP WINDOW IN A DATA PROTECTION SYSTEM

(71) Applicant: Commvault Systems, Inc., Tinton Falls, NJ (US)

(72) Inventor: Rajiv Kottomtharayil, Marlboro, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/705,970

(22) Filed: Mar. 28, 2022

(65) Prior Publication Data

US 2022/0222148 A1 Jul. 14, 2022

Related U.S. Application Data

(60) Continuation of application No. 16/239,490, filed on Jan. 3, 2019, now Pat. No. 11,321,181, which is a
(Continued)

(51) Int. Cl.
*G06F 15/173* (2006.01)
*G06F 9/50* (2006.01)
*G06F 11/14* (2006.01)

(52) U.S. Cl.
CPC .......... *G06F 11/1461* (2013.01); *G06F 9/505* (2013.01); *G06F 11/1464* (2013.01); *G06F 2209/5019* (2013.01); *G06F 2209/506* (2013.01)

(58) Field of Classification Search
CPC .. G06F 11/1461; G06F 9/505; G06F 11/1464; G06F 2209/5019; G06F 2209/506
(Continued)

(56) References Cited

U.S. PATENT DOCUMENTS

| 4,084,231 A | 4/1978 | Capozzi et al. |
| 4,267,568 A | 5/1981 | Dechant et al. |

(Continued)

FOREIGN PATENT DOCUMENTS

| AU | 2009260757 B2 | 8/2012 |
| CA | 2724249 A1 | 12/2009 |

(Continued)

OTHER PUBLICATIONS

US 10,430,280 B2, 10/2019, Vijayan (withdrawn)
(Continued)

*Primary Examiner* — Thuong Nguyen
(74) *Attorney, Agent, or Firm* — Commvault Systems, Inc.

(57) ABSTRACT

A data protection scheduling system provides a flexible or rolling data protection window that analyzes various criteria to determine an optimal or near optimal time for performing data protection or secondary copy operations. While prior systems may have scheduled backups at an exact time (e.g., 2:00 a.m.), the system described herein dynamically determines when to perform the backups and other data protection storage operations, such as based on network load, CPU load, expected duration of the storage operation, rate of change of user activities, frequency of use of affected computer systems, trends, and so on.

19 Claims, 7 Drawing Sheets

Related U.S. Application Data division of application No. 14/294,344, filed on Jun. 3, 2014, now Pat. No. 10,198,324, which is a division of application No. 12/141,776, filed on Jun. 18, 2008, now Pat. No. 8,769,048.

(58) Field of Classification Search
USPC ........................................................ 709/226
See application file for complete search history.

(56) References Cited

U.S. PATENT DOCUMENTS

| | | |
|---|---|---|
| 4,283,787 A | 8/1981 | Chambers |
| 4,394,732 A | 7/1983 | Swenson |
| 4,417,321 A | 11/1983 | Chang et al. |
| 4,464,122 A | 8/1984 | Fuller et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,212,784 A | 5/1993 | Sparks |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,333,315 A | 7/1994 | Saether et al. |
| 5,347,653 A | 9/1994 | Flynn et al. |
| 5,386,545 A | 1/1995 | Gombos |
| 5,410,700 A | 4/1995 | Fecteau et al. |
| 5,420,996 A | 5/1995 | Aoyagi |
| 5,448,718 A | 9/1995 | Cohn |
| 5,448,724 A | 9/1995 | Hayashi et al. |
| 5,450,592 A | 9/1995 | McLeod |
| 5,454,099 A | 9/1995 | Myers et al. |
| 5,485,606 A | 1/1996 | Midgley |
| 5,491,810 A | 2/1996 | Allen |
| 5,495,607 A | 2/1996 | Pisello et al. |
| 5,504,873 A | 4/1996 | Martin et al. |
| 5,517,405 A | 5/1996 | McAndrew et al. |
| 5,537,568 A | 7/1996 | Yanai |
| 5,544,345 A | 8/1996 | Carpenter et al. |
| 5,544,347 A | 8/1996 | Yanai et al. |
| 5,555,371 A | 9/1996 | Duyanovish |
| 5,559,957 A | 9/1996 | Balk |
| 5,559,991 A | 9/1996 | Kanfi |
| 5,564,037 A | 10/1996 | Lam |
| 5,608,865 A | 3/1997 | Midgely |
| 5,613,134 A | 3/1997 | Lucus |
| 5,619,644 A | 4/1997 | Crockett et al. |
| 5,623,598 A * | 4/1997 | Voigt ...................... G06F 11/34 702/182 |
| 5,634,052 A | 5/1997 | Morris |
| 5,638,509 A | 6/1997 | Dunphy et al. |
| 5,642,496 A | 6/1997 | Kanfi |
| 5,659,614 A | 8/1997 | Bailey |
| 5,666,501 A | 9/1997 | Jones |
| 5,673,381 A | 9/1997 | Huai et al. |
| 5,673,382 A | 9/1997 | Cannon |
| 5,699,361 A | 12/1997 | Ding et al. |
| 5,711,010 A | 1/1998 | Naddell |
| 5,729,743 A | 3/1998 | Squibb |
| 5,740,405 A | 4/1998 | DeGraff |
| 5,751,997 A | 5/1998 | Kullick et al. |
| 5,758,359 A | 5/1998 | Saxon |
| 5,758,649 A | 6/1998 | Iwashita |
| 5,761,677 A | 6/1998 | Senator et al. |
| 5,764,972 A | 6/1998 | Crouse et al. |
| 5,778,165 A | 7/1998 | Saxon |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,860,073 A | 1/1999 | Ferrel et al. |
| 5,864,846 A | 1/1999 | Voorhees |
| 5,872,905 A | 2/1999 | Ono |
| 5,875,478 A | 2/1999 | Blumenau |
| 5,887,134 A | 3/1999 | Ebrahim |
| 5,894,585 A | 4/1999 | Inoue |
| 5,896,531 A | 4/1999 | Curtis |
| 5,901,327 A | 5/1999 | Ofek |
| 5,907,672 A | 5/1999 | Matze et al. |
| 5,924,102 A | 7/1999 | Perks |
| 5,950,205 A | 9/1999 | Aviani, Jr. |
| 5,974,563 A | 10/1999 | Beeler, Jr. |
| 5,983,239 A | 11/1999 | Cannon |
| 5,991,753 A | 11/1999 | Wilde |
| 6,009,275 A | 12/1999 | Dekoning |
| 6,012,053 A | 1/2000 | Pant |
| 6,021,415 A | 2/2000 | Cannon et al. |
| 6,026,414 A | 2/2000 | Anglin |
| 6,052,735 A | 4/2000 | Ulrich et al. |
| 6,064,821 A | 5/2000 | Shough |
| 6,073,128 A | 6/2000 | Pongracz |
| 6,076,148 A | 6/2000 | Kedem et al. |
| 6,091,518 A | 7/2000 | Anabuki |
| 6,094,416 A | 7/2000 | Ying |
| 6,112,304 A | 8/2000 | Clawson |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,182,198 B1 | 1/2001 | Hubis |
| 6,212,512 B1 | 4/2001 | Barney et al. |
| 6,226,759 B1 | 5/2001 | Miller |
| 6,239,800 B1 | 5/2001 | Mayhew |
| 6,253,217 B1 | 6/2001 | Dourish |
| 6,260,069 B1 | 7/2001 | Anglin |
| 6,266,679 B1 | 7/2001 | Szalwinski |
| 6,266,784 B1 | 7/2001 | Hsiao |
| 6,269,431 B1 | 7/2001 | Dunham |
| 6,275,953 B1 | 8/2001 | Vahalia et al. |
| 6,298,439 B1 | 10/2001 | Beglin |
| 6,301,592 B1 | 10/2001 | Aoyama et al. |
| 6,308,175 B1 | 10/2001 | Lang et al. |
| 6,324,581 B1 | 11/2001 | Xu et al. |
| 6,327,590 B1 | 12/2001 | Chidlovskii |
| 6,327,612 B1 | 12/2001 | Watanabe |
| 6,328,766 B1 | 12/2001 | Long |
| 6,330,570 B1 | 12/2001 | Crighton et al. |
| 6,330,642 B1 | 12/2001 | Carteau |
| 6,341,287 B1 | 1/2002 | Sziklai et al. |
| 6,343,287 B1 | 1/2002 | Kumar |
| 6,343,324 B1 | 1/2002 | Hubis et al. |
| 6,345,288 B1 | 2/2002 | Reed |
| RE37,601 E | 3/2002 | Eastridge et al. |
| 6,356,801 B1 | 3/2002 | Goodman et al. |
| 6,363,462 B1 | 3/2002 | Bergsten |
| 6,367,073 B2 | 4/2002 | Elledge |
| 6,374,363 B1 | 4/2002 | Wu |
| 6,389,432 B1 | 5/2002 | Pothapragada et al. |
| 6,418,478 B1 | 7/2002 | Ignatius et al. |
| 6,421,678 B2 | 7/2002 | Smiga et al. |
| 6,421,711 B1 | 7/2002 | Blumenau et al. |
| 6,442,706 B1 | 8/2002 | Wahl |
| 6,470,332 B1 | 10/2002 | Weschler |
| 6,484,162 B1 | 11/2002 | Edlund |
| 6,487,561 B1 | 11/2002 | Ofek et al. |
| 6,487,644 B1 | 11/2002 | Huebsch |
| 6,502,205 B1 | 12/2002 | Yanai |
| 6,519,679 B2 | 2/2003 | Devireddy et al. |
| 6,538,669 B1 | 3/2003 | Lagueux, Jr. et al. |
| 6,539,388 B1 | 3/2003 | Hattori |

(56) References Cited

U.S. PATENT DOCUMENTS

| | | | |
|---|---|---|---|
| 6,540,623 | B2 | 4/2003 | Jackson |
| 6,542,972 | B2 | 4/2003 | Ignatius et al. |
| 6,549,918 | B1 | 4/2003 | Probert |
| 6,549,957 | B1 * | 4/2003 | Hanson ................ H04L 51/214 710/5 |
| 6,557,039 | B1 | 4/2003 | Leong |
| 6,564,228 | B1 | 5/2003 | O'Connor |
| 6,593,656 | B2 | 7/2003 | Ahn et al. |
| 6,618,771 | B1 | 9/2003 | Leja |
| 6,618,794 | B1 * | 9/2003 | Sicola ................ G06F 11/1466 714/6.1 |
| 6,629,110 | B2 | 9/2003 | Cane |
| 6,647,399 | B2 | 11/2003 | Zaremba |
| 6,658,436 | B2 | 12/2003 | Oshinsky et al. |
| 6,658,526 | B2 | 12/2003 | Nguyen et al. |
| 6,662,218 | B2 | 12/2003 | Mighdoll et al. |
| 6,675,177 | B1 | 1/2004 | Webb |
| 6,675,299 | B2 | 1/2004 | Porter et al. |
| 6,691,232 | B1 | 2/2004 | Wood et al. |
| 6,721,767 | B2 | 4/2004 | De Meno et al. |
| 6,732,088 | B1 | 5/2004 | Glance |
| 6,732,231 | B1 | 5/2004 | Don |
| 6,732,244 | B2 | 5/2004 | Ashton |
| 6,745,178 | B1 | 6/2004 | Emens |
| 6,760,723 | B2 | 7/2004 | Oshinsky et al. |
| 6,795,828 | B2 | 9/2004 | Ricketts |
| 6,816,941 | B1 | 11/2004 | Carlson |
| 6,820,070 | B2 | 11/2004 | Goldman |
| 6,839,741 | B1 | 1/2005 | Tsai |
| 6,839,803 | B1 | 1/2005 | Loh |
| 6,850,994 | B2 | 2/2005 | Gabryljeski |
| 6,860,422 | B1 | 3/2005 | Hull et al. |
| 6,865,568 | B2 | 3/2005 | Chau |
| 6,871,182 | B1 | 3/2005 | Winnard |
| 6,892,221 | B2 | 5/2005 | Ricart |
| 6,898,650 | B1 | 5/2005 | Gao |
| 6,948,038 | B2 | 9/2005 | Berkowitz |
| 6,948,039 | B2 | 9/2005 | Biessener et al. |
| 6,957,186 | B1 | 10/2005 | Guheen |
| 6,970,997 | B2 | 11/2005 | Shibayama et al. |
| 6,976,039 | B2 | 12/2005 | Chefalas |
| 6,995,675 | B2 | 2/2006 | Curkendall |
| 6,996,616 | B1 | 2/2006 | Leighton |
| 7,003,641 | B2 | 2/2006 | Prahlad et al. |
| 7,028,079 | B2 | 4/2006 | Mastrianni |
| 7,035,880 | B1 | 4/2006 | Crescenti et al. |
| 7,039,860 | B1 | 5/2006 | Gautestad |
| 7,054,960 | B1 | 5/2006 | Bezbaruah |
| 7,058,661 | B2 | 6/2006 | Ciaramitaro |
| 7,099,901 | B2 | 8/2006 | Sutoh |
| 7,107,298 | B2 | 9/2006 | Prahlad et al. |
| 7,107,416 | B2 | 9/2006 | Stuart et al. |
| 7,130,970 | B2 | 10/2006 | Devassy et al. |
| 7,133,870 | B1 | 11/2006 | Tripp et al. |
| 7,139,826 | B2 | 11/2006 | Watanabe |
| 7,139,846 | B1 | 11/2006 | Rossi |
| 7,146,387 | B1 | 12/2006 | Russo |
| 7,155,421 | B1 | 12/2006 | Haldar |
| 7,155,481 | B2 | 12/2006 | Prahlad |
| 7,159,081 | B2 | 1/2007 | Suzuki |
| 7,162,496 | B2 | 1/2007 | Amarendran et al. |
| 7,171,468 | B2 | 1/2007 | Yeung |
| 7,171,585 | B2 | 1/2007 | Gail |
| 7,174,433 | B2 | 2/2007 | Kottomtharayil et al. |
| 7,185,152 | B2 | 2/2007 | Takahashi et al. |
| 7,188,141 | B2 | 3/2007 | Novaes |
| 7,240,100 | B1 | 7/2007 | Wein |
| 7,246,207 | B2 | 7/2007 | Kottomtharayil et al. |
| 7,269,664 | B2 | 9/2007 | Hutsch |
| 7,284,033 | B2 | 10/2007 | Jhanji |
| 7,284,104 | B1 | 10/2007 | Wu et al. |
| 7,287,047 | B2 | 10/2007 | Kavuri |
| 7,290,017 | B1 | 10/2007 | Wang |
| 7,313,659 | B2 | 12/2007 | Suzuki |
| 7,315,923 | B2 | 1/2008 | Retnamma et al. |
| 7,328,325 | B1 | 2/2008 | Solis et al. |
| 7,340,640 | B1 | 3/2008 | Karr |
| 7,343,453 | B2 | 3/2008 | Prahlad et al. |
| 7,346,623 | B2 | 3/2008 | Prahlad |
| 7,346,676 | B1 | 3/2008 | Swildens |
| 7,346,751 | B2 | 3/2008 | Prahlad |
| 7,376,947 | B2 | 5/2008 | Evers |
| 7,379,978 | B2 | 5/2008 | Anderson |
| 7,383,379 | B2 | 6/2008 | Patterson et al. |
| 7,386,535 | B1 | 6/2008 | Kalucha |
| 7,389,311 | B1 | 6/2008 | Crescenti et al. |
| 7,395,282 | B1 | 7/2008 | Crescenti et al. |
| 7,421,460 | B2 | 9/2008 | Chigusa et al. |
| 7,424,543 | B2 | 9/2008 | Rice |
| 7,434,022 | B1 * | 10/2008 | Scharland ........... G06F 11/2092 711/173 |
| 7,434,219 | B2 | 10/2008 | DeMeno |
| 7,440,982 | B2 | 10/2008 | Lu et al. |
| 7,454,569 | B2 | 11/2008 | Kavuri et al. |
| 7,457,790 | B2 | 11/2008 | Kochunni |
| 7,472,142 | B2 | 12/2008 | Prahlad |
| 7,490,207 | B2 | 2/2009 | Amarendran et al. |
| 7,493,458 | B1 * | 2/2009 | Kemeny ................ G06F 3/0611 711/161 |
| 7,496,841 | B2 | 2/2009 | Hadfield |
| 7,500,053 | B1 | 3/2009 | Kavuri et al. |
| 7,529,782 | B2 | 5/2009 | Prahlad et al. |
| 7,536,291 | B1 | 5/2009 | Vijayan Retnamma et al. |
| 7,543,125 | B2 | 6/2009 | Gokhale |
| 7,545,593 | B1 | 6/2009 | Sun et al. |
| 7,546,324 | B2 | 6/2009 | Prahlad et al. |
| 7,565,484 | B2 | 7/2009 | Ghosal |
| 7,577,689 | B1 | 8/2009 | Mastiner et al. |
| 7,577,694 | B2 | 8/2009 | Nakano |
| 7,581,077 | B2 | 8/2009 | Ignatius |
| 7,584,469 | B2 | 9/2009 | Mitekura |
| 7,587,715 | B1 | 9/2009 | Barrett |
| 7,593,935 | B2 | 9/2009 | Sullivan |
| 7,596,713 | B2 | 9/2009 | Mani-Meitav et al. |
| 7,603,386 | B2 | 10/2009 | Amarendran et al. |
| 7,603,626 | B2 | 10/2009 | Williams |
| 7,606,844 | B2 | 10/2009 | Kottomtharayil |
| 7,610,285 | B1 | 10/2009 | Zoellner et al. |
| 7,613,752 | B2 | 11/2009 | Prahlad et al. |
| 7,617,253 | B2 | 11/2009 | Prahlad et al. |
| 7,617,262 | B2 | 11/2009 | Prahlad et al. |
| 7,620,710 | B2 | 11/2009 | Kottomtharayil et al. |
| 7,636,743 | B2 | 12/2009 | Erofeev |
| 7,651,593 | B2 | 1/2010 | Prahlad et al. |
| 7,656,849 | B1 | 2/2010 | Evans |
| 7,657,550 | B2 | 2/2010 | Prahlad et al. |
| 7,660,807 | B2 | 2/2010 | Prahlad et al. |
| 7,661,028 | B2 | 2/2010 | Erofeev |
| 7,668,884 | B2 | 2/2010 | Prahlad |
| 7,673,175 | B2 | 3/2010 | Mora et al. |
| 7,676,542 | B2 | 3/2010 | Moser |
| 7,689,899 | B2 | 3/2010 | Leymaster |
| 7,698,520 | B2 | 4/2010 | Minami et al. |
| 7,730,031 | B2 | 6/2010 | Forster |
| 7,734,593 | B2 | 6/2010 | Prahlad |
| 7,734,669 | B2 | 6/2010 | Kottomtharayil et al. |
| 7,747,579 | B2 | 6/2010 | Prahlad et al. |
| 7,751,628 | B1 | 7/2010 | Reisman |
| 7,761,409 | B2 | 7/2010 | Stefik et al. |
| 7,792,789 | B2 | 9/2010 | Prahlad |
| 7,801,864 | B2 | 9/2010 | Prahlad et al. |
| 7,801,871 | B2 | 9/2010 | Gosnell |
| 7,809,914 | B2 | 10/2010 | Kottomtharayil et al. |
| 7,814,118 | B2 | 10/2010 | Kottomtharayil |
| 7,827,266 | B2 | 11/2010 | Gupta |
| 7,831,793 | B2 | 11/2010 | Chakravarty et al. |
| 7,840,537 | B2 | 11/2010 | Gokhale |
| 7,844,676 | B2 | 11/2010 | Prahlad |
| 7,865,517 | B2 | 1/2011 | Prahlad |
| 7,865,938 | B2 | 1/2011 | Shahbazi |
| 7,882,077 | B2 | 2/2011 | Gokhale |
| 7,882,093 | B2 | 2/2011 | Kotttomtharayil |
| 7,882,097 | B1 | 2/2011 | Ogilvie |
| 7,904,929 | B1 | 3/2011 | Jaunin et al. |

(56) References Cited

U.S. PATENT DOCUMENTS

| | | |
|---|---|---|
| 7,937,393 B2 | 5/2011 | Prahlad |
| 7,937,420 B2 | 5/2011 | Tabellion |
| 7,937,702 B2 | 5/2011 | De Meno |
| 7,984,063 B2 | 7/2011 | Kottomtharayil |
| 7,984,435 B2 | 7/2011 | Kokkinen |
| 8,037,028 B2 | 10/2011 | Prahlad |
| 8,055,627 B2 | 11/2011 | Prahlad |
| 8,060,514 B2 | 11/2011 | Arrrouye et al. |
| 8,069,218 B1 | 11/2011 | Tormasov |
| 8,078,607 B2 | 12/2011 | Oztekin et al. |
| 8,099,428 B2 | 1/2012 | Kottomtharayil |
| 8,108,427 B2 | 1/2012 | Prahlad |
| 8,117,173 B2 | 2/2012 | Gurevich |
| 8,126,854 B1 | 2/2012 | Sreedharan |
| 8,131,784 B1 | 3/2012 | Zhuge |
| 8,140,786 B2 | 3/2012 | Bunte et al. |
| 8,141,157 B2 | 3/2012 | Farley et al. |
| 8,145,742 B1 | 3/2012 | Parker |
| 8,156,086 B2 | 4/2012 | Lu et al. |
| 8,161,003 B2 | 4/2012 | Kavuri |
| 8,170,995 B2 | 5/2012 | Prahlad et al. |
| 8,200,637 B1 | 6/2012 | Stringham |
| 8,200,638 B1 | 6/2012 | Zheng |
| 8,219,524 B2 | 7/2012 | Gokhale |
| 8,229,954 B2 | 7/2012 | Kottomtharayil et al. |
| 8,230,054 B2 | 7/2012 | Mutnuru et al. |
| 8,230,195 B2 | 7/2012 | Amarendran et al. |
| RE43,678 E | 9/2012 | Major et al. |
| 8,285,681 B2 | 10/2012 | Prahlad et al. |
| 8,307,177 B2 | 11/2012 | Prahlad et al. |
| 8,346,777 B1 | 1/2013 | Auerbach et al. |
| 8,347,088 B2 | 1/2013 | Moore et al. |
| 8,352,954 B2 | 1/2013 | Gokhale |
| 8,356,209 B2 | 1/2013 | Gunabalasubramaniam et al. |
| 8,364,652 B2 | 1/2013 | Vijayan et al. |
| 8,370,166 B2 | 2/2013 | Ronnewinkel |
| 8,370,542 B2 | 2/2013 | Lu et al. |
| 8,396,838 B2 | 3/2013 | Brockway |
| 8,423,731 B1 | 4/2013 | Nadathur et al. |
| 8,463,989 B2 | 6/2013 | Kumagai |
| 8,468,538 B2 | 6/2013 | Attarde et al. |
| 8,473,585 B1 | 6/2013 | Smith et al. |
| 8,477,618 B2 | 7/2013 | Martin |
| 8,495,315 B1 | 7/2013 | Rudolph et al. |
| 8,495,331 B2 | 7/2013 | Matsumoto |
| 8,505,010 B2 | 8/2013 | De Meno |
| 8,510,573 B2 | 8/2013 | Muller |
| 8,566,285 B2 * | 10/2013 | Altrichter ............ G06F 9/4856 |
| | | 718/103 |
| 8,578,120 B2 | 11/2013 | Attarde et al. |
| 8,612,394 B2 | 12/2013 | Prahlad |
| 8,655,850 B2 | 2/2014 | Ngo et al. |
| 8,706,867 B2 | 4/2014 | Vijayan |
| 8,707,070 B2 | 4/2014 | Muller |
| 8,719,809 B2 | 5/2014 | Gohkale |
| 8,725,688 B2 | 5/2014 | Lad |
| 8,769,048 B2 * | 7/2014 | Kottomtharayil ....... G06F 9/505 |
| | | 709/219 |
| 8,775,823 B2 | 7/2014 | Gokhale |
| 8,782,064 B2 | 7/2014 | Kottomtharayil |
| 8,826,284 B1 | 9/2014 | Fuller |
| 8,832,706 B2 | 9/2014 | Gokhale et al. |
| 8,849,762 B2 | 9/2014 | Kumarasamy |
| 8,954,446 B2 | 2/2015 | Vijayan Retnamma et al. |
| 8,959,299 B2 | 2/2015 | Ngo et al. |
| 8,966,288 B2 | 2/2015 | Ignatius |
| 8,977,672 B2 | 3/2015 | Karandikar |
| 9,020,900 B2 | 4/2015 | Vijayan Retnamma et al. |
| 9,092,378 B2 | 7/2015 | Kumarasamy |
| 9,098,495 B2 | 8/2015 | Gokhale |
| 9,122,692 B1 | 9/2015 | Dalal |
| 9,128,742 B1 | 9/2015 | Akolkar et al. |
| 9,128,883 B2 | 9/2015 | Gokhale |
| 9,235,582 B1 | 1/2016 | Madiraju Varadaraju |
| 9,239,687 B2 | 1/2016 | Vijayan et al. |
| 9,262,226 B2 | 2/2016 | Gokhale et al. |
| 9,274,803 B2 | 3/2016 | De Meno et al. |
| 9,348,827 B1 | 5/2016 | Patwardhan |
| 9,411,821 B1 | 8/2016 | Patwardhan |
| 9,444,726 B2 | 9/2016 | Baldwin |
| 9,444,811 B2 | 9/2016 | Nara |
| 9,459,968 B2 | 10/2016 | Vijayan |
| 9,633,033 B2 | 4/2017 | Vijayan et al. |
| 9,633,216 B2 | 4/2017 | Gokhale |
| 9,639,274 B2 | 5/2017 | Maranna et al. |
| 9,639,400 B2 | 5/2017 | Gokhale et al. |
| 9,645,762 B2 | 5/2017 | Nara |
| 9,648,100 B2 | 5/2017 | Klose et al. |
| 9,690,666 B1 | 6/2017 | Shembavnekar et al. |
| 9,740,574 B2 | 8/2017 | Kochunni et al. |
| 9,766,825 B2 | 9/2017 | Bhagi |
| 10,157,184 B2 | 12/2018 | Yongtao et al. |
| 10,162,714 B2 | 12/2018 | Hohl et al. |
| 10,198,324 B2 | 2/2019 | Kottomtharayil |
| 10,310,950 B2 | 6/2019 | Kochunni et al. |
| 10,652,212 B2 * | 5/2020 | Parekh ................ H04L 45/745 |
| 10,754,729 B2 | 8/2020 | Mehta |
| 10,761,942 B2 | 9/2020 | Mehta et al. |
| 10,860,443 B2 | 12/2020 | Dwarampudi et al. |
| 10,891,069 B2 | 1/2021 | Ashraf et al. |
| 11,237,915 B2 | 2/2022 | Mehta et al. |
| 11,321,181 B2 | 5/2022 | Kottomtharayil |
| 2001/0012986 A1 | 8/2001 | Conan |
| 2001/0028363 A1 | 10/2001 | Nomoto |
| 2001/0052058 A1 | 12/2001 | Ohran |
| 2002/0032878 A1 | 3/2002 | Karpf |
| 2002/0049883 A1 | 4/2002 | Schneider |
| 2002/0062369 A1 * | 5/2002 | von Klopp ............ G06F 16/955 |
| | | 709/224 |
| 2002/0120858 A1 | 8/2002 | Porter et al. |
| 2002/0138589 A1 | 9/2002 | Al-Kazily et al. |
| 2002/0198882 A1 * | 12/2002 | Linden ................ G06F 16/904 |
| 2003/0028592 A1 | 2/2003 | Ooho |
| 2003/0046313 A1 | 3/2003 | Leung et al. |
| 2003/0046396 A1 | 3/2003 | Richter |
| 2003/0050979 A1 | 3/2003 | Takahashi |
| 2003/0065897 A1 | 4/2003 | Sadowsky |
| 2003/0084086 A1 * | 5/2003 | Simpson ................ H04L 67/02 |
| | | 709/201 |
| 2003/0095500 A1 | 5/2003 | Cao |
| 2003/0101086 A1 | 5/2003 | San Miguel |
| 2003/0101155 A1 | 5/2003 | Gokhale et al. |
| 2003/0188085 A1 * | 10/2003 | Arakawa ............... G06F 3/0605 |
| | | 711/100 |
| 2004/0039689 A1 | 2/2004 | Penney et al. |
| 2004/0068713 A1 | 4/2004 | Yannakoyorgos |
| 2004/0098383 A1 | 5/2004 | Tabellion |
| 2004/0098423 A1 | 5/2004 | Chigusa et al. |
| 2004/0193827 A1 * | 9/2004 | Mogi .................. G06F 11/3433 |
| | | 711/170 |
| 2004/0204949 A1 | 10/2004 | Shaji et al. |
| 2004/0205206 A1 | 10/2004 | Naik et al. |
| 2004/0220980 A1 | 11/2004 | Forster |
| 2004/0236532 A1 * | 11/2004 | Wheless, Jr. .......... G11C 29/02 |
| | | 702/120 |
| 2004/0267815 A1 | 12/2004 | De Mes |
| 2005/0039069 A1 | 2/2005 | Prahlad |
| 2005/0076087 A1 | 4/2005 | Budd |
| 2005/0091229 A1 | 4/2005 | Bali et al. |
| 2005/0091346 A1 | 4/2005 | Krishnaswami et al. |
| 2005/0097070 A1 | 5/2005 | Enis |
| 2005/0132018 A1 * | 6/2005 | Milic-Frayling ..... G06F 16/955 |
| | | 707/E17.112 |
| 2005/0149949 A1 | 7/2005 | Tipton et al. |
| 2005/0154562 A1 * | 7/2005 | Matsuura ............. G06F 11/008 |
| | | 702/185 |
| 2005/0216788 A1 | 9/2005 | Mani-Meitav |
| 2005/0232669 A1 * | 10/2005 | Ishikawa ............... G03G 21/105 |
| | | 399/358 |
| 2005/0246510 A1 | 11/2005 | Retnamma |
| 2005/0251393 A1 * | 11/2005 | Georgescu ............ G06F 16/957 |
| | | 704/270.1 |
| 2005/0251786 A1 | 11/2005 | Citron |

(56) References Cited

U.S. PATENT DOCUMENTS

| | | |
|---|---|---|
| 2005/0278207 A1 | 12/2005 | Ronnewinkel |
| 2006/0010286 A1* | 1/2006 | Topham .............. G06F 11/1464 |
| | | 711/111 |
| 2006/0036619 A1 | 2/2006 | Fuerst |
| 2006/0070061 A1 | 3/2006 | Cox |
| 2006/0075007 A1 | 4/2006 | Anderson et al. |
| 2006/0080370 A1 | 4/2006 | Torii |
| 2006/0110286 A1 | 5/2006 | Boukas |
| 2006/0115802 A1 | 6/2006 | Reynolds |
| 2006/0116999 A1 | 6/2006 | Dettinger |
| 2006/0123420 A1 | 6/2006 | Nishikawa |
| 2006/0149604 A1 | 7/2006 | Miller |
| 2006/0149724 A1 | 7/2006 | Ritter |
| 2006/0168589 A1 | 7/2006 | Moore |
| 2006/0177114 A1 | 8/2006 | Tongdee et al. |
| 2006/0195678 A1 | 8/2006 | Jalobeanu |
| 2006/0195838 A1 | 8/2006 | Epstein |
| 2006/0224846 A1 | 10/2006 | Amarendran et al. |
| 2006/0224852 A1* | 10/2006 | Kottomtharayil ..... G06F 3/0605 |
| | | 711/170 |
| 2006/0265396 A1 | 11/2006 | Raman et al. |
| 2006/0271935 A1 | 11/2006 | Cox |
| 2006/0282900 A1 | 12/2006 | Johnson et al. |
| 2007/0014347 A1 | 1/2007 | Prechtl |
| 2007/0016750 A1 | 1/2007 | Suzuki |
| 2007/0022122 A1 | 1/2007 | Bahar |
| 2007/0022145 A1 | 1/2007 | Kavuri |
| 2007/0028229 A1 | 2/2007 | Knatcher |
| 2007/0043715 A1 | 2/2007 | Kaushik |
| 2007/0061266 A1 | 3/2007 | Moore et al. |
| 2007/0061298 A1 | 3/2007 | Wilson et al. |
| 2007/0067595 A1 | 3/2007 | Ghose |
| 2007/0128899 A1 | 6/2007 | Mayer |
| 2007/0136541 A1 | 6/2007 | Herz et al. |
| 2007/0143497 A1 | 6/2007 | Kottomtharayil |
| 2007/0156783 A1 | 7/2007 | Zbogar-Smith et al. |
| 2007/0166674 A1 | 7/2007 | Kochunni |
| 2007/0174246 A1 | 7/2007 | Sigurdsson |
| 2007/0183493 A1 | 8/2007 | Kimpe |
| 2007/0185915 A1 | 8/2007 | Prahlad et al. |
| 2007/0208788 A1 | 9/2007 | Chakravarty et al. |
| 2007/0214330 A1 | 9/2007 | Minami et al. |
| 2007/0220308 A1 | 9/2007 | Yeung et al. |
| 2007/0226320 A1 | 9/2007 | Hager et al. |
| 2007/0226535 A1 | 9/2007 | Gokhale |
| 2007/0233865 A1* | 10/2007 | Garbow .............. G06F 11/0796 |
| | | 709/226 |
| 2007/0239687 A1 | 10/2007 | Seymour |
| 2007/0239836 A1* | 10/2007 | Ahn ..................... G06Q 10/107 |
| | | 709/206 |
| 2007/0250810 A1 | 10/2007 | Tittizer |
| 2007/0271308 A1 | 11/2007 | Bentley et al. |
| 2007/0288861 A1 | 12/2007 | Tabellion et al. |
| 2007/0296258 A1 | 12/2007 | Calvert et al. |
| 2008/0016310 A1 | 1/2008 | Ghosal et al. |
| 2008/0022003 A1 | 1/2008 | Alve |
| 2008/0033903 A1 | 2/2008 | Carol et al. |
| 2008/0115138 A1* | 5/2008 | Nachimuthu ......... G06F 9/4812 |
| | | 718/102 |
| 2008/0126302 A1 | 5/2008 | Mora et al. |
| 2008/0155205 A1 | 6/2008 | Gokhale |
| 2008/0168308 A1 | 7/2008 | Eberbach et al. |
| 2008/0177994 A1 | 7/2008 | Mayer |
| 2008/0184241 A1 | 7/2008 | Headrick et al. |
| 2008/0222640 A1 | 9/2008 | Daly et al. |
| 2008/0235604 A1 | 9/2008 | Ebert |
| 2008/0263297 A1 | 10/2008 | Herbst et al. |
| 2008/0263565 A1 | 10/2008 | Luther |
| 2008/0282048 A1 | 11/2008 | Miura |
| 2008/0288947 A1 | 11/2008 | Gokhale et al. |
| 2008/0288948 A1* | 11/2008 | Attarde ................ G06F 3/0643 |
| | | 718/103 |
| 2008/0320319 A1 | 12/2008 | Muller et al. |
| 2009/0006733 A1* | 1/2009 | Gold ..................... G06F 3/0617 |
| | | 711/111 |
| 2009/0113435 A1 | 4/2009 | Mizrachi et al. |
| 2009/0119322 A1 | 5/2009 | Mills |
| 2009/0150168 A1 | 6/2009 | Schmit |
| 2009/0150626 A1* | 6/2009 | Benhase ............... G06F 11/1448 |
| | | 711/E12.103 |
| 2009/0171883 A1 | 7/2009 | Kochunni |
| 2009/0180155 A1* | 7/2009 | Kato ..................... H04N 1/3877 |
| | | 358/448 |
| 2009/0187908 A1 | 7/2009 | He |
| 2009/0228531 A1 | 9/2009 | Baumann |
| 2009/0307448 A1 | 12/2009 | Gokhale |
| 2009/0319534 A1 | 12/2009 | Gokhale |
| 2009/0320029 A1 | 12/2009 | Kottomtharayil |
| 2009/0320033 A1 | 12/2009 | Gokhale et al. |
| 2010/0005259 A1 | 1/2010 | Prahlad |
| 2010/0031017 A1 | 2/2010 | Gokhale et al. |
| 2010/0036772 A1 | 2/2010 | Arceneaux |
| 2010/0070466 A1 | 3/2010 | Prahlad |
| 2010/0070474 A1 | 3/2010 | Kamleshkumar |
| 2010/0070725 A1 | 3/2010 | Prahlad et al. |
| 2010/0070726 A1 | 3/2010 | Nao et al. |
| 2010/0076932 A1 | 3/2010 | Lad |
| 2010/0091547 A1* | 4/2010 | Ogiwara ................. G11C 11/22 |
| | | 365/191 |
| 2010/0114837 A1 | 5/2010 | Prahlad |
| 2010/0125477 A1 | 5/2010 | Mousseau |
| 2010/0161773 A1 | 6/2010 | Prahlad |
| 2010/0172301 A1 | 7/2010 | Watfa |
| 2010/0180332 A1 | 7/2010 | Ben-Yochanan |
| 2010/0205582 A1 | 8/2010 | Liu |
| 2010/0228709 A1* | 9/2010 | Ahmed ................. G06F 3/0659 |
| | | 711/E12.001 |
| 2010/0250549 A1 | 9/2010 | Muller |
| 2010/0257240 A1* | 10/2010 | Singh ..................... G06F 9/546 |
| | | 709/204 |
| 2010/0262911 A1 | 10/2010 | Kaplan et al. |
| 2010/0274983 A1 | 10/2010 | Murphy et al. |
| 2010/0299490 A1 | 11/2010 | Attarde et al. |
| 2010/0302884 A1* | 12/2010 | Lee ........................... G11C 7/04 |
| | | 365/194 |
| 2010/0306283 A1 | 12/2010 | Johnson et al. |
| 2010/0306643 A1 | 12/2010 | Chabot et al. |
| 2010/0332401 A1 | 12/2010 | Prahlad |
| 2010/0332454 A1 | 12/2010 | Prahlad |
| 2010/0332456 A1 | 12/2010 | Prahlad et al. |
| 2010/0332479 A1 | 12/2010 | Prahlad |
| 2011/0016091 A1 | 1/2011 | Prahlad |
| 2011/0069179 A1 | 3/2011 | Bathiche et al. |
| 2011/0093471 A1 | 4/2011 | Brockway et al. |
| 2011/0138225 A1 | 6/2011 | Gunabalasubramaniam et al. |
| 2011/0161299 A1 | 6/2011 | Prahlad et al. |
| 2011/0173171 A1 | 7/2011 | De Meno et al. |
| 2011/0173202 A1 | 7/2011 | Paknad et al. |
| 2011/0231362 A1 | 9/2011 | Attarde et al. |
| 2011/0302141 A1 | 12/2011 | Nadathur |
| 2012/0011515 A1 | 1/2012 | Jolfaei |
| 2012/0036108 A1 | 2/2012 | Prahlad et al. |
| 2012/0066633 A1 | 3/2012 | Saito |
| 2012/0084524 A1 | 4/2012 | Gokhale |
| 2012/0084782 A1 | 4/2012 | Chou |
| 2012/0094674 A1 | 4/2012 | Wu |
| 2012/0124294 A1* | 5/2012 | Atkisson .............. G06F 12/0804 |
| | | 711/135 |
| 2012/0150818 A1 | 6/2012 | Vijayan Retnamma et al. |
| 2012/0150826 A1 | 6/2012 | Vijayan Retnamma et al. |
| 2012/0203742 A1 | 8/2012 | Goodman et al. |
| 2012/0254116 A1 | 10/2012 | Thereka et al. |
| 2012/0254119 A1 | 10/2012 | Kumarasamy et al. |
| 2012/0254824 A1 | 10/2012 | Bansod |
| 2012/0263191 A1 | 10/2012 | Baron |
| 2012/0265754 A1 | 10/2012 | Kottomtharavil et al. |
| 2012/0272205 A1 | 10/2012 | Fox |
| 2012/0275598 A1 | 11/2012 | Vimpari et al. |
| 2012/0317085 A1 | 12/2012 | Green et al. |
| 2013/0006625 A1 | 1/2013 | Gunatilake et al. |
| 2013/0007710 A1 | 1/2013 | Vedula |

(56) References Cited

U.S. PATENT DOCUMENTS

| | | |
|---|---|---|
| 2013/0013883 A1 | 1/2013 | Kottomtharayil |
| 2013/0024429 A1 | 1/2013 | Raas |
| 2013/0024568 A1 | 1/2013 | Popczynski |
| 2013/0046817 A1 | 2/2013 | Isbister |
| 2013/0067274 A1* | 3/2013 | Huang .................. G06F 3/065 714/6.22 |
| 2013/0104027 A1 | 4/2013 | Bennett et al. |
| 2013/0110854 A1 | 5/2013 | Kimber et al. |
| 2013/0111326 A1 | 5/2013 | Lockhart |
| 2013/0117716 A1* | 5/2013 | Stevens ................ G06F 16/954 715/841 |
| 2013/0136253 A1 | 5/2013 | Liberman Ben-Ami et al. |
| 2013/0145376 A1 | 6/2013 | Gokhale et al. |
| 2013/0179405 A1 | 7/2013 | Bunte |
| 2013/0219458 A1 | 8/2013 | Ramanathan et al. |
| 2013/0232184 A1 | 9/2013 | Grube |
| 2013/0238562 A1 | 9/2013 | Kumarasamy |
| 2013/0238969 A1 | 9/2013 | Smith et al. |
| 2013/0262387 A1 | 10/2013 | Varadharajan |
| 2013/0262396 A1 | 10/2013 | Kripalani |
| 2013/0262410 A1 | 10/2013 | Liu et al. |
| 2013/0262615 A1 | 10/2013 | Ankireddypalle |
| 2013/0262706 A1 | 10/2013 | Stahlberg |
| 2013/0326159 A1 | 12/2013 | Vijayan |
| 2013/0332412 A1 | 12/2013 | Amarendran |
| 2013/0332505 A1 | 12/2013 | Karandikar |
| 2014/0025641 A1 | 1/2014 | Kumarasamy |
| 2014/0026000 A1 | 1/2014 | Ma |
| 2014/0040210 A1 | 2/2014 | Avery |
| 2014/0040580 A1 | 2/2014 | Kripalani |
| 2014/0046900 A1 | 2/2014 | Kumarasamy |
| 2014/0046904 A1 | 2/2014 | Kumarasamy |
| 2014/0086127 A1 | 3/2014 | Kim |
| 2014/0108351 A1 | 4/2014 | Nallathambi |
| 2014/0108355 A1 | 4/2014 | Prahlad |
| 2014/0108470 A1 | 4/2014 | Lad |
| 2014/0150023 A1 | 5/2014 | Gudorf |
| 2014/0156732 A1* | 6/2014 | Lanni ..................... H04L 67/01 709/203 |
| 2014/0172793 A1 | 6/2014 | Stritzel |
| 2014/0180664 A1 | 6/2014 | Kochunni |
| 2014/0181032 A1 | 6/2014 | Kumarasamy |
| 2014/0181037 A1 | 6/2014 | Pawar |
| 2014/0181045 A1 | 6/2014 | Pawar |
| 2014/0181085 A1 | 6/2014 | Gokhale |
| 2014/0181443 A1 | 6/2014 | Kottomtharayil |
| 2014/0188805 A1 | 7/2014 | Vijayan |
| 2014/0188812 A1 | 7/2014 | Vijayan |
| 2014/0188980 A1* | 7/2014 | Longhenry ............. H04W 4/21 709/203 |
| 2014/0189432 A1 | 7/2014 | Gokhale |
| 2014/0201140 A1 | 7/2014 | Vibhor |
| 2014/0201142 A1 | 7/2014 | Varadharajan |
| 2014/0201150 A1 | 7/2014 | Kumarasamy |
| 2014/0201154 A1 | 7/2014 | Varadharajan |
| 2014/0201155 A1 | 7/2014 | Vijayan |
| 2014/0201161 A1 | 7/2014 | Kumarasamy |
| 2014/0201162 A1 | 7/2014 | Kumarasamy |
| 2014/0201170 A1 | 7/2014 | Vijayan et al. |
| 2014/0201171 A1 | 7/2014 | Vijayan |
| 2014/0250076 A1 | 9/2014 | Lad |
| 2014/0279922 A1 | 9/2014 | Kottomtharayil et al. |
| 2014/0281214 A1 | 9/2014 | Rehm |
| 2014/0289189 A1 | 9/2014 | Chan |
| 2014/0289196 A1 | 9/2014 | Chan |
| 2014/0337285 A1 | 11/2014 | Gokhale et al. |
| 2014/0365443 A1 | 12/2014 | Goel |
| 2015/0023086 A1* | 1/2015 | Wendell ..................... G11C 5/06 365/72 |
| 2015/0067181 A1* | 3/2015 | Roy ......................... H04L 67/02 709/227 |
| 2015/0081948 A1 | 3/2015 | Thereska |
| 2015/0186487 A1 | 7/2015 | Karandikar |
| 2015/0193229 A1 | 7/2015 | Bansod et al. |
| 2015/0194221 A1* | 7/2015 | Hong ..................... G11C 17/16 365/96 |
| 2015/0227355 A1 | 8/2015 | Tripoli |
| 2015/0234879 A1 | 8/2015 | Baldwin |
| 2015/0244775 A1 | 8/2015 | Vibhor |
| 2015/0278024 A1 | 10/2015 | Barman et al. |
| 2015/0301903 A1 | 10/2015 | Mutha et al. |
| 2015/0324226 A1 | 11/2015 | Gokhale et al. |
| 2015/0324233 A1 | 11/2015 | Gokhale |
| 2015/0331899 A1 | 11/2015 | Gokhale et al. |
| 2015/0347238 A1 | 12/2015 | Kumarasamy et al. |
| 2015/0350133 A1* | 12/2015 | Murphy .................. H04L 67/02 709/203 |
| 2015/0381522 A1* | 12/2015 | Cai ......................... H04L 47/803 370/389 |
| 2016/0110266 A1 | 4/2016 | Nara |
| 2016/0140199 A1 | 5/2016 | Karandikar |
| 2016/0350391 A1 | 12/2016 | Vijayan et al. |
| 2016/0371153 A1 | 12/2016 | Dornemann et al. |
| 2016/0378616 A1 | 12/2016 | Wigmore et al. |
| 2017/0024286 A1 | 1/2017 | Vijayan |
| 2017/0134487 A1 | 5/2017 | Karandikar |
| 2017/0134492 A1 | 5/2017 | Klose et al. |
| 2017/0160970 A1 | 6/2017 | Gokhale |
| 2017/0160971 A1 | 6/2017 | Gokhale |
| 2017/0168903 A1 | 6/2017 | Dornemann et al. |
| 2017/0185488 A1 | 6/2017 | Kumarasamy et al. |
| 2017/0192866 A1 | 7/2017 | Vijayan et al. |
| 2017/0193003 A1 | 7/2017 | Vijayan et al. |
| 2017/0199924 A1 | 7/2017 | Gokhale |
| 2017/0206018 A1 | 7/2017 | Nara et al. |
| 2017/0206112 A1 | 7/2017 | Gokhale |
| 2017/0235647 A1 | 8/2017 | Kilaru et al. |
| 2017/0242871 A1 | 8/2017 | Kilaru et al. |
| 2018/0011767 A1 | 1/2018 | Kochunni et al. |
| 2018/0013825 A1 | 1/2018 | Klose et al. |
| 2018/0048705 A1 | 2/2018 | Karandikar |
| 2018/0067819 A1 | 3/2018 | Kotha et al. |
| 2018/0129435 A1 | 5/2018 | Bhagi et al. |
| 2018/0225177 A1 | 8/2018 | Bhagi et al. |
| 2018/0275881 A1 | 9/2018 | Ashraf |
| 2018/0285201 A1 | 10/2018 | Bangalore |
| 2018/0285209 A1 | 10/2018 | Liu |
| 2018/0285353 A1 | 10/2018 | Rao |
| 2019/0065509 A1 | 2/2019 | Liu et al. |
| 2019/0073254 A1 | 3/2019 | Vibhor et al. |
| 2019/0087108 A1 | 5/2019 | Bhagi et al. |
| 2019/0155699 A1 | 5/2019 | Luo et al. |
| 2019/0213462 A1* | 7/2019 | McDonald ......... G06Q 10/0833 |
| 2019/0243911 A1 | 8/2019 | Kobozev et al. |
| 2019/0278668 A1 | 9/2019 | Kochunni et al. |
| 2019/0286839 A1 | 9/2019 | Mutha et al. |
| 2021/0056001 A1 | 2/2021 | Dwarampudi et al. |

FOREIGN PATENT DOCUMENTS

| | | |
|---|---|---|
| EP | 0259912 A1 | 3/1988 |
| EP | 0405926 A2 | 1/1991 |
| EP | 0467546 A2 | 1/1992 |
| EP | 0541281 | 5/1993 |
| EP | 0774715 A1 | 5/1997 |
| EP | 0809184 A1 | 11/1997 |
| EP | 0899662 A1 | 3/1999 |
| EP | 0910019 A2 | 4/1999 |
| EP | 0981090 A1 | 2/2000 |
| EP | 0986011 | 3/2000 |
| EP | 1035690 | 9/2000 |
| GB | 2216368 A | 10/1989 |
| JP | 07-046271 A1 | 2/1995 |
| JP | 07-073080 A | 3/1995 |
| JP | 08-044598 A | 2/1996 |
| JP | 2000-035969 | 2/2000 |
| JP | 2003-531435 | 10/2003 |
| WO | WO 95/13580 A1 | 5/1995 |
| WO | WO 99/12098 A1 | 3/1999 |
| WO | WO 2000/58865 | 10/2000 |
| WO | WO 2001/06368 A1 | 1/2001 |
| WO | WO 2001/16693 | 3/2001 |

(56) References Cited

FOREIGN PATENT DOCUMENTS

| WO | WO 2001/80005 | 10/2001 |
|---|---|---|
| WO | WO 2006/052872 | 5/2006 |
| WO | WO 2009/154806 A1 | 12/2009 |

OTHER PUBLICATIONS

U.S. Appl. No. 09/609,977, filed Jul. 5, 2000, Prahlad.
"Multi Instancing," retrieved from http://documentation.commvault.com/hds/release_8_0_0/books_online_1/english_us/deployment/install/misc/multi_instancing.htm[Feb. 18, 2014 11:57:19 AM] on Feb. 18, 2014, 3 pages.
Armstead et al., "Implementation of a Campus-Wide Distributed Mass Storage Service: The Dream vs. Reality," IEEE, 1995, pp. 190-199.
Arneson, "Mass Storage Archiving in Network Environments" IEEE, Oct. 31-Nov. 1998, pp. 45-50.
Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Eitel, "Backup and Storage Management in Distributed Heterogeneous Environments," IEEE, 1994, pp. 124-126.
Gait, "The Optical File Cabinet: A Random-Access File system for Write-Once Optical Disks," IEEE Computer, vol. 21, No. 6, pp. 11-22 (Jun. 1988).
Hennessy et al., "Computer Architecture—A Quantitative Approach", 2nd Edition, 1996, pp. 246-250.
Huff, KL, "Data Set Usage Sequence Number," IBM Technical Disclosure Bulletin, vol. 24, No. 5, Oct. 1981 New York, US, pp. 2404-2406.
Hutchinson, Norman C., et al., "Logical vs. physical file system backup", OSDI, vol. 99, 1999, 12 pages.
Jander, "Launching Storage-Area Net," Data Communications, US, McGraw Hill, NY, vol. 27, No. 4(Mar. 21, 1998), pp. 64-72.
Matthews, Jeanna, et al. "Data protection and rapid recovery from attack with a virtual private file server and virtual machine appliances." Proceedings of the IASTED International Conference on Communication, Network and Information Security (CNIS 2005). 2005, 14 pages.
Microsoft Press Computer Dictionary Third Edition, "Data Compression," Microsoft Press, 1997, p. 130.
Pitoura et al., "Locating Objects in Mobile Computing", IEEE Transactions on Knowledge and Data Engineering, vol. 13, No. 4, Jul./Aug. 2001, pp. 571-592.
Quinlan, Sean. "A cached worm file system." Software: Practice and Experience, vol. 21, No. 12, 1991, pp. 1289-1299.
Rosenblum et al., "The Design and Implementation of a Log-Structure File System," Operating Systems Review SIGOPS, vol. 25, No. 5, May 1991, New York, US, pp. 1-15.
Rowe et al., "Indexes for User Access to Large Video Databases", Storage and Retrieval for Image and Video Databases II, IS, & T/SPIE Symp. On Elec. Imaging Sci. & Tech., Feb. 1994, pp. 1-12.
Veeravalli, B., "Network Caching Strategies for a Shared Data Distribution for a Predefined Service Demand Sequence," IEEE Transactions on Knowledge and Data Engineering, vol. 15, No. 6, Nov./Dec. 2003, pp. 1487-1497.
Wu, Chin-Hsien, Tei-Wei Kuo, and Li-Pin Chang. "Efficient initialization and crash recovery for log-based file systems over flash memory.", Proceedings of the 2006 ACM symposium on Applied computing. ACM, 2006, 5 pages.
Examination Report in Australian Patent Application No. 2009260757, mailing date Nov. 25, 2011, 2 pages.
International Search Report and Written Opinion for PCT/US2011/054374, dated May 2, 2012, 9 pages.
Extended European Search Report for Application No. EP 09767119.2, mail date Feb. 11, 2013, 12 pages.
Examination Report in European Patent Application No. 09767119.2, mailing date Feb. 1, 2018, 3 pages.
Notice of Allowance for Canada Patent Application No. 2724249 dated Jan. 28, 2015, 1 page.
International Search Report and Written Opinion received for PCT Patent Application No. PCT/US2009/032325, mailed on Mar. 17, 2009, 8 pages.
International Preliminary Report on Patentability for International Application No. PCT/US2009/032325, date of mailing Mar. 17, 2009, 11 pages.
Arneson, David A., "Development of Omniserver," Control Data Corporation, Tenth IEEE Symposium on Mass Storage Systems, May 1990, 'Crisis in Mass Storage' Digest of Papers, pp. 88-93, Monterey, CA.

\* cited by examiner

| JOBS | SYSTEM | HISTORICAL |
|---|---|---|
| ① window<br>② missed cycles<br>③ priority<br>④ other | ① current usage<br>② scheduled usage<br>③ predicted usage<br>④ other usage | ① historical usage<br>② historical other |

*FIG. 7*

DATA PROTECTION SCHEDULING, SUCH AS PROVIDING A FLEXIBLE BACKUP WINDOW IN A DATA PROTECTION SYSTEM

CROSS-REFERENCE TO RELATED APPLICATIONS

This application is a Continuation of U.S. patent application Ser. No. 16/239,490 filed on Jan. 3, 2019, which is a divisional of U.S. patent application Ser. No. 14/294,344 filed on Jun. 3, 2014 (now U.S. Pat. No. 10,198,324), which is a divisional of U.S. patent application Ser. No. 12/141,776 filed Jun. 18, 2009 (now U.S. Pat. No. 8,769,048), all of which are hereby incorporated by reference in their entireties herein.

BACKGROUND

Computer systems contain large amounts of information. This information includes personal information, such as financial information, customer/client/patient contact information, business information, audio/visual information, and much more. This information also includes information related to the correct operation of the computer system, such as operating system files, application files, user settings, and so on. With the increased reliance on computer systems to store critical information, the importance of protecting information has grown. Traditional storage systems receive an identification of a file to protect, and then create one or more secondary copies, such as backup files, containing the contents of the file. These secondary copies can then later be used to restore the original data should anything happen to the original data.

In corporate environments, protecting information is generally part of a routine process that information technologists perform for many computer systems within an organization. For example, a company might back up critical computing systems related to e-commerce such as databases, file servers, web servers, and so on as part of a daily, weekly, or monthly maintenance schedule. The company may also protect computing systems used by each of its employees, such as those used by an accounting department, marketing department, engineering department, and so forth.

Often, these systems are required to store large amounts of data (e.g. all of a company's data files) during a time period known as a "storage window." The storage window defines a duration and actual time period when the system may perform storage operations. For example, a storage window may be for twelve hours, between 6 PM and 6 AM (that is, twelve non-business hours).

Often, storage windows are rigid and unable to be modified. Therefore, when data storage systems attempt to store increasing data loads, they may need to do so without increasing the time in which they operate. Additionally, many systems perform daily stores, which may add further reliance on completing storage operations during allotted storage windows.

Additionally, or alternatively, current systems may attempt to store a large number of distinct jobs, or groups of data, chunks of data, and so on. The system may look at each job as a separate storage operation, which often leads to fragmentation on secondary storage devices (tapes, magnetic disks, and so on) that receive data stores as the storage devices develop small gaps of unused space between spaces containing data. In these cases, the system may inefficiently restore stored data because of the fragmentation that occurs during the data storage process.

The foregoing examples of some existing limitations are intended to be illustrative and not exclusive. Other limitations will become apparent to those of skill in the art upon a reading of the Detailed Description below. These and other problems exist with respect to data storage management systems.

BRIEF DESCRIPTION OF THE DRAWINGS

FIG. 7 is a table illustrating criteria used in scheduling a data storage operation.

DETAILED DESCRIPTION

Overview

Figure 1A:
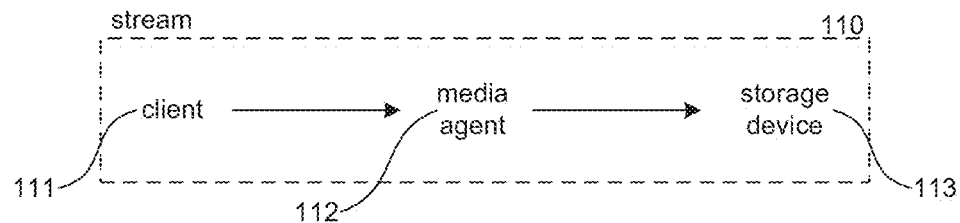
FIG. 1A is a block diagram illustrating an example of components used in data storage operations.

Described in detail below is a system for dynamically providing a flexible or "rolling" data protection window that analyzes various criteria to determine an (optimal or near optimal) time for performing data protection or secondary copy operations within certain parameters. While prior systems may have scheduled backups at an exact time (e.g., 2:00 a.m.), the system described herein dynamically determines when to perform the backups and other data storage operations, such as based on network load, CPU load, expected duration of the storage operation, rate of change of user activities, frequency of use of affected computer systems, trends, data priority, compliance factors, and so on.

In some examples, the system first receives a request to perform a storage operation. For example, a data storage system may receive a request to protect all of the data from a particular computer system. The request may include, among other things, a deadline to complete data protection of the data, an identification of storage processes to be used in protecting the data, and/or other criteria used to guide the storage operation.

The system may then review the criteria included in the request as well as performance and other metrics tied to the storage operation to determine how and when to perform the storage operation. For example, the metrics may indicate the use capacity of storage operation components, may predict when a storage network is under (or over) a threshold, may indicate when a media library to which data will be transferred is not in use, and so on.

Then, the system may schedule the data storage operation based on the reviewed metrics. In some cases, the system changes or modifies a previously determined schedule of operations based on other scheduled storage operations, new information about network load, or other factors that may affect the successful completion or timing of the storage operation. Also, by dynamically scheduling storage operations, the system is able to avoid at least some conflicts between computer systems over resources needed to perform the storage operations and reduces the impact on primary storage resources. Thus, the system can provide a dynamically determined schedule for data storage operations, such as a schedule that is more likely to be able to accommodate most or all of the desired operations within a storage window.

Therefore, the system dynamically determines a time to perform the storage operation and the components used to facilitate the storage operation based on criteria included in a request to protect data and based on (predicted) characteristics of the storage operation used to carry out the request. That is, the system may review a dynamic storage policy, a policy that provides storage operation instructions to the system based on the needs of a storage request and the characteristics of the system.

In some cases, the dynamic storage policy may be part of a flexible priority system for performing storage operations, or jobs. The priority system may instruct a storage system to perform certain categories of jobs in a predetermined order, while allowing the system to dynamically determine the order of other categories of jobs. For example, the priority system may instruct a storage system to perform all hard coded jobs first (jobs that must be completed within a time window), to perform all soon to expire jobs second (that is, any jobs having a deadline of completion less than a threshold deadline, or previously postponed jobs), and to perform all other jobs based on a flexible and dynamically determined schedule of operations.

Various examples of the system will now be described. The following description provides specific details for a thorough understanding and enabling description of these examples. One skilled in the art will understand, however, that the system may be practiced without many of these details. Additionally, some well-known structures or functions may not be shown or described in detail, so as to avoid unnecessarily obscuring the relevant description of the various examples.

The terminology used in the description presented below is intended to be interpreted in its broadest reasonable manner, even though it is being used in conjunction with a detailed description of certain specific examples of the system. Certain terms may even be emphasized below; however, any terminology intended to be interpreted in any restricted manner will be overtly and specifically defined as such in this Detailed Description section.

Suitable System

Referring to FIG. 1A, a block diagram illustrating components of a data storage system with which the data protection scheduling system can be used is shown. The data storage system 110 may include a client 111, a media agent 112, and a secondary storage device 113. For example, in storage operations, the system may store, receive and/or prepare data to be stored, copied or backed up at a server or client 111. The system may then transfer the data to be stored to media agent 112, which may then refer to storage policies, schedule policies, and/or retention policies (and other policies) to choose a secondary storage device 113 for storage of the data. Secondary storage devices may be magnetic tapes, optical disks, USB, SSD and other similar media, disk and tape drives, and so on. The combination of all of the components (or a device containing all the components) needed to perform a storage operation (e.g., a client, media agent, and secondary storage device) may be referred to as a data stream.

Figure 1B:
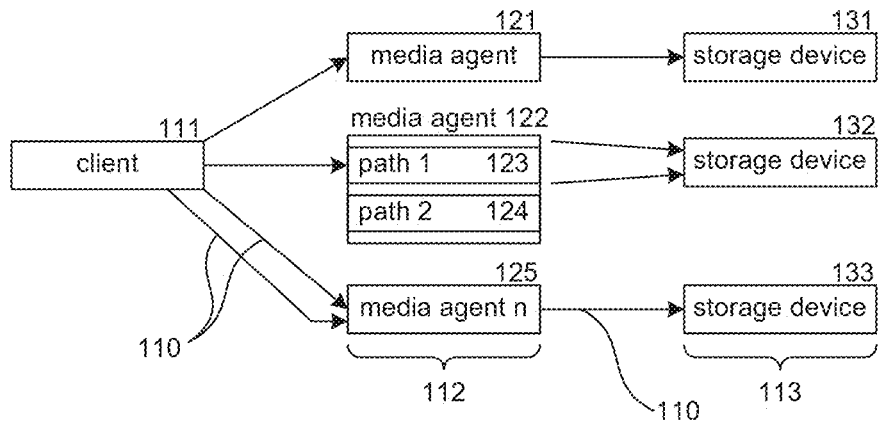
FIG. 1B is a block diagram illustrating an alternative example of components used in data storage operations.

Referring to FIG. 1B, a block diagram illustrating components of multiple selectable data streams is shown. Client 111 and any one of multiple media agents 112 may form a stream 110. For example, one stream may contain client 111, media agent 121, and storage device 131, while a second stream (or multiple streams) may use media agent 125, storage device 133, and the same client 111. Additionally, media agents may contain additional subpaths 123, 124 that may increase the number of possible streams for client 111. Examples of subpaths 123, 124 include host bus adapter (HBA) cards, Fibre Channel cards, SCSI cards, wireless paths, and so on. Thus, the system is able to stream data from client 111 to multiple secondary storage devices 113 via multiple media agents 112 using multiple streams.

Figure 1C:
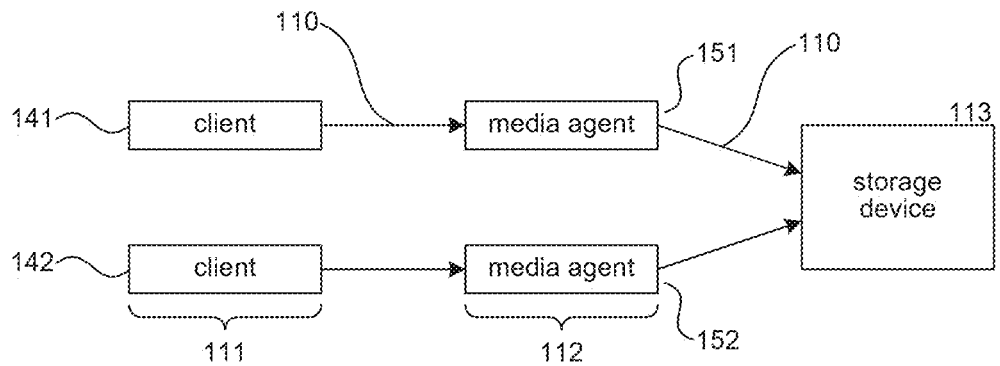
FIG. 1C is a block diagram illustrating an alternative example of components used in data storage operations.

Referring to FIG. 1C, a block diagram illustrating components of alternative multiple selectable data streams is shown. In this example, the system may transfer data from multiple media agents 151, 152 to the same storage device 113. For example, one stream may be from client 141, to media agent 151, to secondary storage device 113, and a second stream may be from client 142, to media agent 152, to secondary storage device 113. Thus, the system is able to copy data to one secondary storage device 113 using multiple streams 110. Additionally, the system may stream data from one client to two media agents and to one storage device. Of course, the system may employ other configurations of stream components not shown in the Figures.

Figure 2:
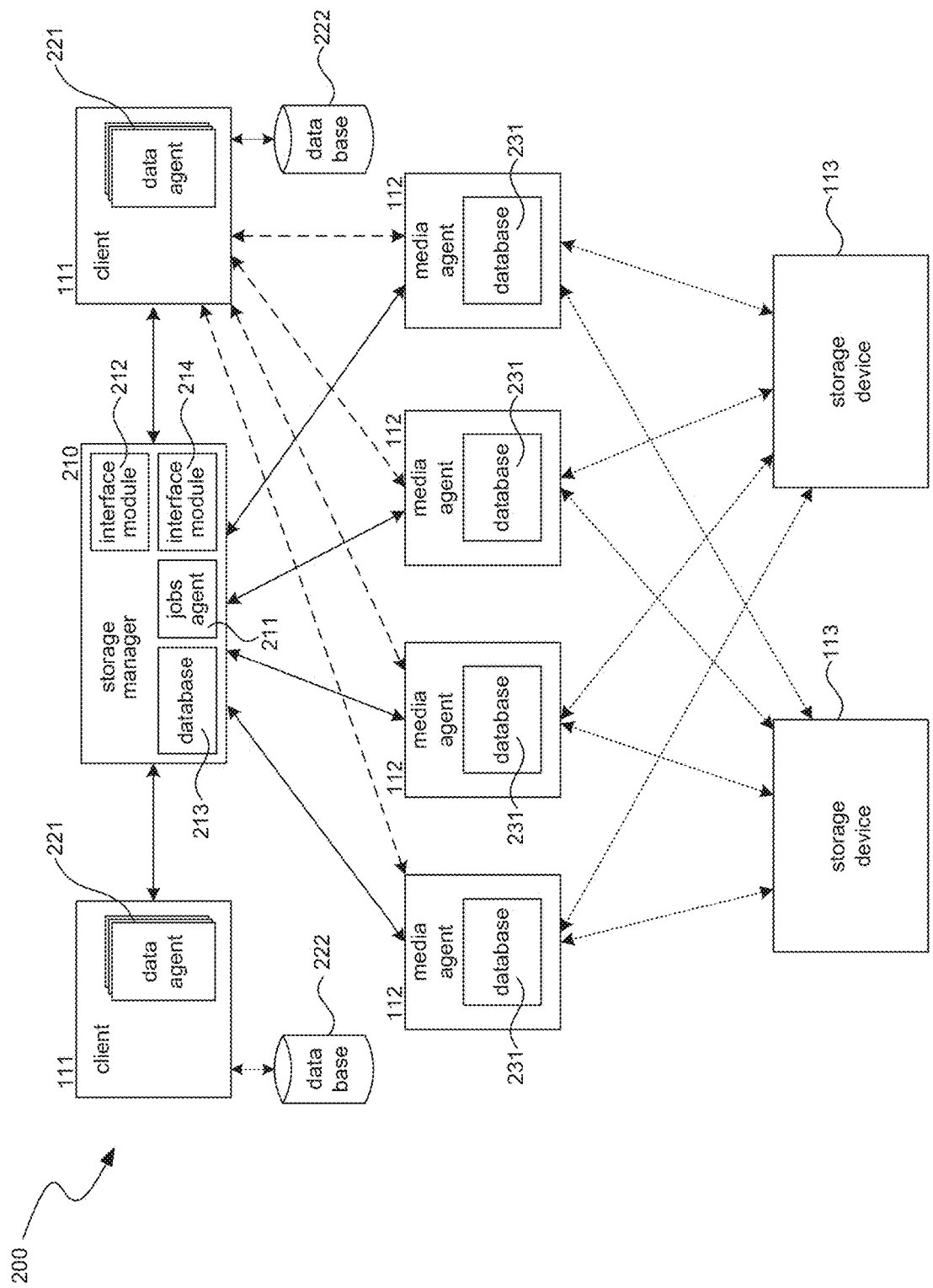
FIG. 2 is a block diagram illustrating an example of a data storage system.

Referring to FIG. 2, a block diagram illustrating an example of a data storage system 200 is shown. Data storage systems may contain some or all of the following components, depending on the needs of the system. For example, the data storage system 200 contains a storage manager 210, one or more clients 111, one or more media agents 112, and one or more storage devices 113. Storage manager 210 controls media agents 112, which may be responsible for transferring data to storage devices 113. Storage manager 210 includes a jobs agent 211, a management agent 212, a database 213, and/or an interface module 214. Storage manager 210 communicates with client(s) 111. One or more clients 111 may access data to be stored by the system from database 222 via a data agent 221. The system uses media agents 112, which contain databases 231, to transfer and store data into storage devices 113. Client databases 222 may contain data files and other information, while media agent databases may contain indices and other data structures that assist and implement the storage of data into secondary storage devices, for example.

The data storage system may include software and/or hardware components and modules used in data storage operations. The components may be storage resources that function to copy data during storage operations. The components may perform other storage operations (or storage management operations) other that operations used in data stores. For example, some resources may create, store, retrieve, and/or migrate primary or secondary data copies. A primary copy is an original copy of data (for example, the copy of data created by a file system), while a secondary copy may be any copy of the primary copy. Example secondary copies may include snapshot copies, backup copies, HSM copies, archive copies, and so on. The resources may also perform storage management functions that may communicate information to higher-level components, such as global management resources.

In some examples, the system performs storage operations based on storage policies, as mentioned above. For example, a storage policy includes a set of preferences or other criteria that instruct or guide storage operations. The storage policy may define, identify, or indicate a storage location and/or set of preferences about how the system transfers data to the location and what processes the system performs on the data before, during, or after the data transfer. For example, the storage policy may be a dynamically changing policy based on factors, metrics and other characteristics of storage operations and requests to perform storage operations. These characteristics may include a job priority (such as a priority provided by the flexible priority system or by an administrator), a scheduling priority (such as a priority based on deadlines of completion of some or all scheduled jobs), the type of data (e.g., exchange and SQL data may have different priorities), and so on. In some cases, a (dynamic) storage policy may define a logical bucket in which to transfer, store or copy data from a source to a data store, such as storage media, based on a current or predicted status of the storage operation. Storage policies may be stored in storage manager 210, or may be stored in other resources, such as a global manager, a media agent, and so on. Further details regarding storage management and resources for storage management will now be discussed.

Figure 3:
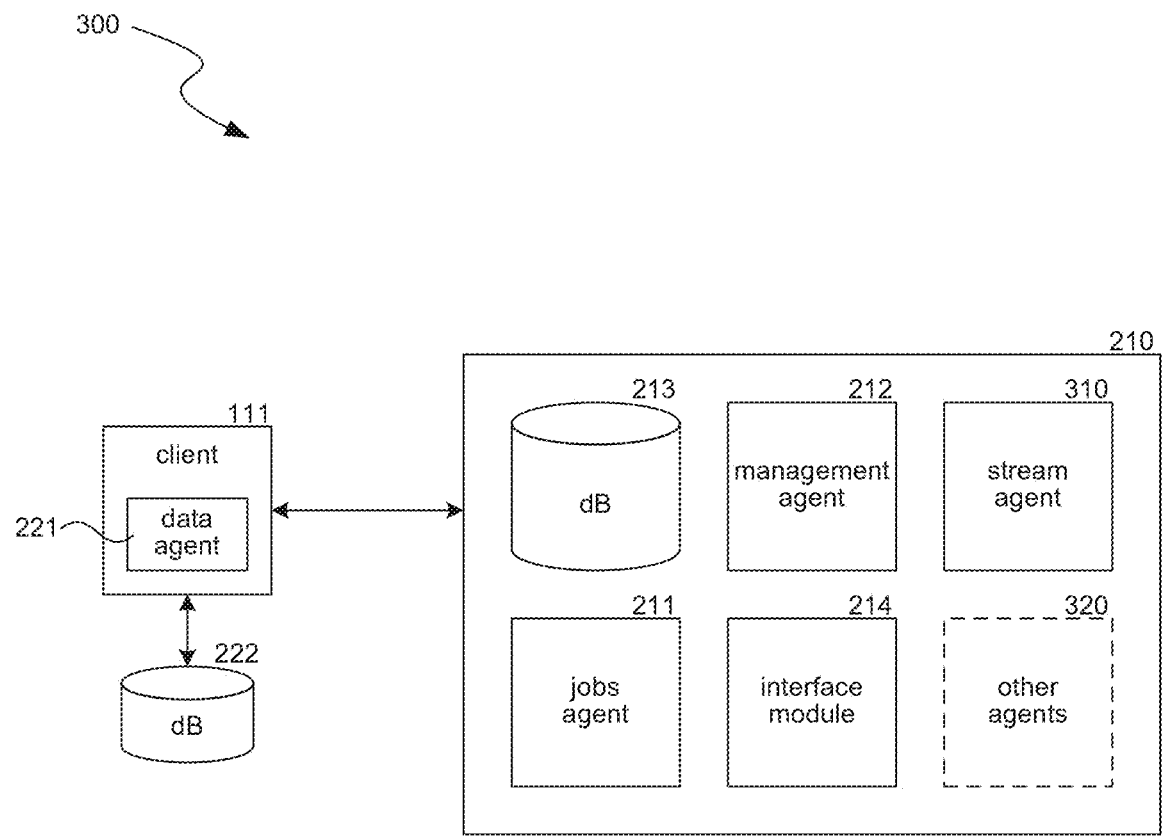
FIG. 3 is a block diagram illustrating an example of components of a server used in data storage operations.

Referring to FIG. 3, a block diagram illustrating an example of components of a server used in data storage operations is shown. A server, such as storage manager 210, may communicate with clients 111 to determine data to be copied to primary or secondary storage. As described above, the storage manager 210 may contain a jobs agent 211, a management agent 212, a database 213, and/or an interface module. Jobs agent 211 may manage and control the scheduling of jobs (such as copying data files) from clients 111 to media agents 112. Management agent 212 may control the overall functionality and processes of the data storage system, or may communicate with global managers. Database 213 or another data structure may store storage policies, schedule policies, retention policies, or other information, such as historical storage statistics, storage trend statistics, and so on. Interface module 215 may interact with a user interface, enabling the system to present information to administrators and receive feedback or other input from the administrators or with other components of the system (such as via APIs).

Further examples of suitable systems and methods may be found in U.S. patent application Ser. No. 11/963,581, filed on Dec. 21, 2007, entitled SYSTEMS AND METHODS OF DATA STORAGE MANAGEMENT, SUCH AS DYNAMIC DATA STREAM ALLOCATION, which is incorporated by reference in its entirety.

Using a Data Storage Window to Affect Storage Operations

In some cases, the system may modify or change storage operations based on a review of a storage window. In some cases the system considers the data storage window to be dynamically determined period of time when the system may perform data storage operations. In other cases, the storage window is rigid for some or all storage operations and the system should complete such any associated data transfers within the window. Therefore, a dynamic review of the storage window during or prior to data storage operations may assist storage systems in completing storage tasks within an allotted window of time.

Figure 4:
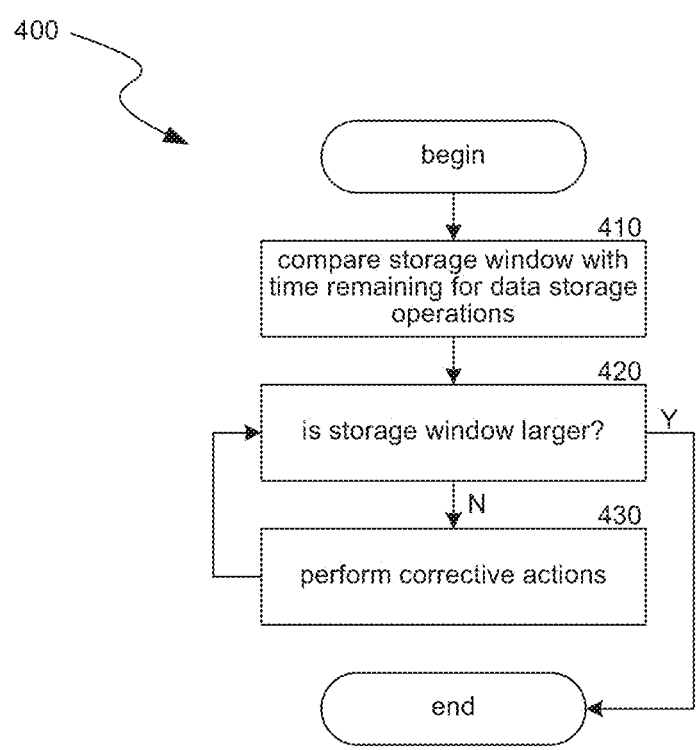
FIG. 4 is a flow diagram illustrating an example of a routine for selecting storage resources in a data storage operation.

Referring to FIG. 4, a flow diagram illustrating a routine 400 as an example of selecting storage resources in a data storage operation begins in step 410, where the system may compare the storage window with an estimated time remaining to complete data storage operations. For example, the system may calculate an estimate of the time required to complete all pending job transfers, and compare the estimated time with the time allotted to run data transfers. In step 420, if the time allotted is larger than the time estimate, routine 400 ends and the system performs scheduled operations within the window, else routine 400 proceeds to step 430. In step 430, the system performs corrective operations. Examples of corrective operations may include the dynamic stream management discussed above, using more resources, selecting a subset of the remaining jobs to store, sending remaining jobs to an alternative or "standby" data storage system, moving or modifying the window for certain jobs, obtaining guidance from the flexible priority system, moving certain jobs outside the window (to be discussed herein), and so on. After performing corrective actions, routine 400 proceeds back to step 420, and compares the new estimated time against the time allotment.

In some cases, the system may review, monitor, or track default pathways (such as streams) and modify storage operations if there is not enough time in the storage window to complete all data transfers using the default pathways. For example, the system may select high-speed pathways instead of default pathways for data of a certain type and nature (such as high priority or unprotected data).

The system may perform routine 400 as infrequently or as often as necessary, depending on the needs of the system or the progress of data storage operations. For example, the system may track the performed corrective measures to determine their effectiveness, and determine a frequency in which to perform the routine within the window. When a corrective measure causes the estimated time of completion to fall within the storage window, the system may perform the routine at a lesser frequency than when the estimated time of completion is not within the storage window. Also, the system may perform routine 400 to obtain information about data storage operations, to be used in performing corrections at a later time. The system may determine patterns, statistics, metrics, criteria, characteristics and/or historical information about the storage operations and associated resources from routine 400. For example, in a 12 hour time allotted storage window, the system may run routine 400 twelve times, once per hour. Comparing the twelve iterations, the system may determine a pattern of high resource use, low resource use, and so on, and modify future data storage operations accordingly.

Figure 5:
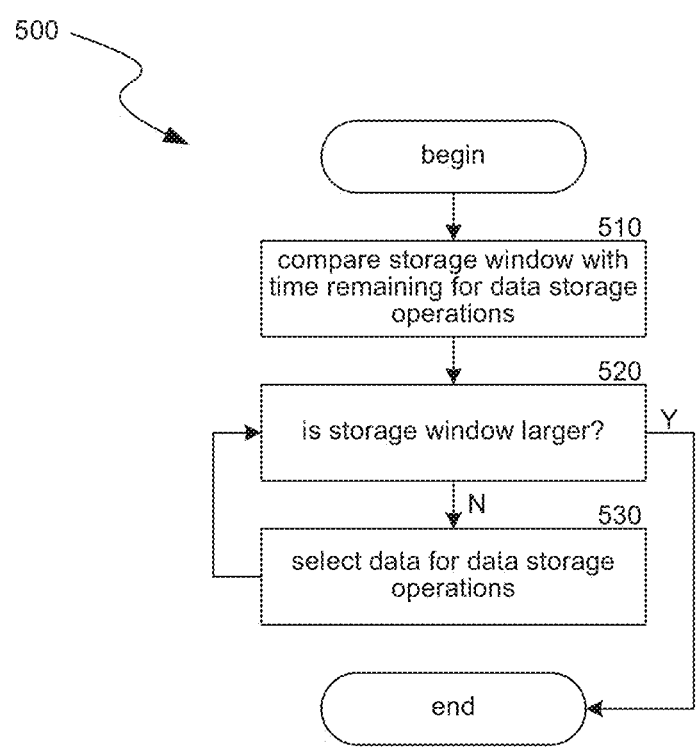
FIG. 5 is a flow diagram illustrating an example of a routine for performing a selected storage operation.

In some cases, the system may be able to delay the transfer of some types of data in order to transfer other types of data within the storage window. Referring to FIG. 5, a flow diagram illustrating an example of performing a selected storage operation is shown. In step 510, the system may compare the storage window with an estimated time remaining to complete data storage operations. For example, the system may estimate the time required to complete all pending job transfers, and compare the estimated time with the time allotted to run transfer operations. In step 520, if the time allotted is larger than the time estimate, routine 500 ends and performs the transfer operations in the time allotted, else routine 500 proceeds to step 530. In step 530, the system may select certain jobs to store based on information received from the flexible priority system, and delay other jobs. For example, the system may be able to store some types of data outside of the storage window, to be discussed herein. The system may then select these jobs and move them out of the job queue, to a delayed jobs queue.

After selecting "priority" jobs, routine 500 proceeds back to step 520, and compares the new estimated time against the time allotment. The system transfers all "priority" jobs, and only goes to the delayed job queue after the main job queue is empty of priority jobs. The system may then transfer the delayed jobs during the remaining time of the storage window, may transfer the jobs outside of the job window, or may be able to send the jobs to the next scheduled storage operation or data transfer, and transfer the remaining jobs during that operation.

Assigning some jobs a priority may be arbitrary or contingent on the needs of the system. The system may assign priorities to types of files (e.g., metadata, such as user-defined content) or jobs within a storage policy 210. The system may enable users to determine what types of jobs are priority jobs. The system may maintain some jobs as always being priority, or may change these preferences on a case-by-case basis. For example, a user may set a policy to flag all financial data as "priority," and set a policy to never flag email data (or email from certain user groups) as "priority." However, in some cases, the reverse may be more desirable. The system may also assign a higher priority to a job that was delayed or missed in a previous window. In some cases, the system may update or modify metadata, data classification or other preferences, and may assign priorities to characteristics of data as well as to data.

As discussed herein, a flexible priority system may instruct a data storage system to perform certain jobs before other jobs. The flexible priority system may identify jobs having the highest priority (such as hard coded jobs), jobs having a next highest priority (such as jobs set to expire, jobs required to be completed within a storage window), and jobs having a flexible priority that changes (based on the factors described herein) in order to optimize the performance of the data storage system. Further details will now be discussed.

Flexible Storage Window

The system looks at various criteria to determine an (optimal or near optimal) period for performing a storage operation. The criteria can include one or more of the following: job priority, types of data within the job, network traffic or load, a disk load, CPU usage, expected backup duration, and so on. For example, the system may gather relevant metrics or other parameters during a predetermined period, such as over a 24- to 48-hour period, which may identify within a one to two day period a time in which to perform a data storage operation for a job that was not completed during a storage window.

Figure 6:
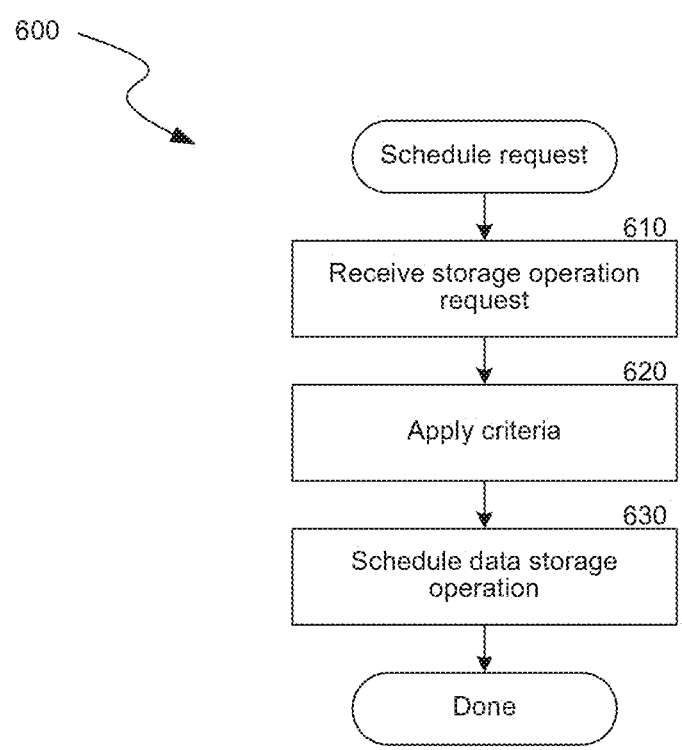
FIG. 6 is a flow diagram illustrating the overall process performed in scheduling data storage operations.

FIG. 6 is a flow diagram that illustrates the overall process performed by the data protection scheduling system in one embodiment. In step 610, the system receives a request to perform a storage operation. The storage operation may include one or more request criteria that indicate parameters of the request, such as a deadline for completing the request, a desired frequency (e.g., once per hour) that the request should be performed, and so forth. In step 620, the system applies one or more criteria to determine a suitable time to perform the request. For example, the system may determine a priority for the request, the computer systems that will be used for performing the request, the network loads on or between the computer systems, the availability of resources on the computing systems (e.g., processor time, memory, and storage space), the availability of a media library or storage media, and so on.

The criteria may also take into account any request criteria. For example, if the network load is at its lowest point in two hours, and its second to lowest point in 45 minutes, then the system may select the second lowest point to perform the storage operation if a request criteria requests that the storage operation be completed within the next hour.

In step 630, the system schedules the data storage operation based on the performance criteria, among other factors. The system may revisit the schedule periodically based on changes to conditions that affect the scheduling of requests. For example, a new media agent may be added to the network to which some of the load can be distributed. The system dynamically schedules performing storage operations.

The system may also look at historical data or other periods outside a one to two day period. For example, by analyzing one or more months of data, the system can identify trends or historical data. Thus, the system can determine a rate of change, frequency of use, particularly with respect to particular data, data sources, departments, etc. Thus, the system may determine that when a particular user goes home, network activity drops. They can notice trends, such as trends based on vacations, school schedules, etc., and perform actions based on those events. Thus, users, processes, historical trends, pattern recognition, rate of change and amount of access may all be analyzed by the system to determine an optimal or new optimal window for backup processes.

In some examples, a priority system determines when the system is to perform required and/or requested storage operations. In some cases, the priority system instructs a storage system to perform all hard coded jobs first (jobs that must be completed within a time window). The hard coded jobs may be certain daily backups or other data required to be copied within a time window. Once these jobs are completed, the storage system performs all soon to expire jobs second (that is, any jobs having a deadline of completion less than a threshold deadline, or previously postponed jobs), and performs all other jobs based on the flexible and dynamically determined schedule of operations described herein. Such a flexible priority system ensures, among other things, that a data storage system can complete all data storage operations when they are required to be completed, even when certain operations are not completed when originally scheduled.

Dynamically Determining when to Perform Storage Operations

The system may review historical data or information about previously performed jobs or usage of storage operation resources, and predict when to start a job, even if the start time falls outside a storage window. The data may identify a time when the usage resources are predicted to be at a "low" usage level (e.g., below a threshold level of a load on the resources), and start the job at that time. For example, the system may determine that the usage level for certain resources drops during a typical lunch hour (e.g., 12:00 to 1:00 P.M.), and select a job to complete during that time that is expected to be completed within an hour.

Once a job starts, the system may also monitor the usage of the resources and make decisions based on the monitored usage. For example, the system may start a job and after a certain time the job (and other jobs or operations) may cause the load on the resources to exceed a threshold value. Such an occurrence may cause the system to stop the job until the load drops below the threshold value (or, until the predicted load drops below the threshold value). At this time, the system may restart the job using the resources. Additionally, the system may assign a higher priority to partially completed jobs, which may affect the threshold value.

As discussed with respect to FIG. 6, the system identifies and applies criteria to determine a time in which to start or perform a storage operation, such as a job. In some cases, the system applies multiple criteria. For example, the system may look at (1) criteria associated with the job or jobs, (2) criteria associated with the data storage system, and/or (3) criteria associated with historical information with respect to the job or jobs, the system and its resources, and so on. The system may then use the criteria as weighting factors within rules or algorithms that determine threshold requirements for starting jobs.

Referring to FIG. 7, a table 700 including criteria used in scheduling a job is shown. The criteria include a jobs criterion 710, system criterion 720, and historical data criterion 730. Each of the criterion includes various metrics 715 associated with that criterion. For example, for a given job, the job criterion 710 may include a metric attributed to the time window in which to complete the job, a metric attributed to an assigned priority for the job, and so on. Similarly, the system criterion 720 may be affected by the current usage of system resources, a scheduled usage, a predicted usage, and so on. The historical criterion 730 may consider historical trends or patterns, such as those discussed herein.

Thus, the system may look to table 700 when scheduling a job. For example, after a storage window ends, a number of jobs (e.g., two) remain to be performed. Job A is a high priority job but historical data determines that the job causes a high load to system resources (e.g. CPU load). Job B is a lower priority job but causes a lower load to the system resources. Using the table, the system may determine the following:

Job A: Start job whenever system resources usage is less than 40% threshold from a maximum system load (may be a calculation of current usage plus predicted usage due to job)

Job B: Start job whenever system resources usage is less than 70% threshold.

Also preempt Job B with Job A when Job A threshold is obtained.

Thus, when a usage factor of system resources moves below the 70% threshold or is predicted to do so by historical data (such as the lunch hour example described herein), a data storage system begins performing Job B. Should the usage factor move below the 40% threshold, Job B is stopped and Job A begins. Once the usage factor moves above the 40% threshold (but less than 70%), Job A is stopped and Job B is restarted. Should the usage factor move above the 70% threshold, both jobs are stopped.

As discussed herein, the rules assigned to the jobs may dynamically change during storage operations. For example, if Job B is more than half way completed, the system may assign the job a higher priority than the priority assigned to Job A. In this example, Job B would continue to perform even when the usage factor moves below the 40% threshold.

In some examples, the system looks at a large period of time (such as a months' worth of data) to identify lulls in the system resources, and make predictions about the usage of the system resources. The system then determines when to start a job based on the predictions, and schedules the job.

In some examples, the flexible priority system exempts certain jobs from the dynamically determined scheduling. The system may determine priorities for particular jobs, departments, users, and so forth. These jobs/departments/users/etc. may be exempt from flexible scheduling, and instead have a set data storage window, such as a window specified by an administrator. For example, hard coded and expiring jobs may not be flexibly scheduled. Thus, the flexible priority system may increase the priority of certain jobs/departments/users/etc. based on historical data, current performance, and so on. As one example, if a client was last in the queue last week, it may then be moved closer to the top of the queue for the current week, and vice versa, depending on various factors.

In some examples, the system employs a scoring metric. For example, the system may add some weighting to encourage a data storage operation to be scheduled sooner if a particular job did not get processed on a given date, is close to expiration, was started but not completed, and so on. As another example, a job may get a negative weighting for the next data storage window if the job was placed high in the job queue and completed for a current data storage window.

In some examples, the system may employ an alternating approach to flexibly assigning jobs to available storage windows. For example, the flexible priority system may identify jobs having relatively equal priority and schedule the jobs to be performed one-by-one, or in parallel where possible based on available resources.

In some examples, the system looks at request criteria to dynamically determine the scheduling of data storage operations. For example, a request may specify that a data storage operation must occur at least once per hour, such as for protecting financial transaction data or other frequently changing data. The data protection scheduling system then looks at past scheduling of the job to determine the current schedule of the job so that the system schedules the job in a way that satisfies the request criteria. Such request criteria may identify hard coded or other "highest" priority jobs, or may identify jobs always available as being flexible to the system.

Conclusion

The system may perform some or all of the above examples in combination with one another. For example, the system may use aspects of dynamic stream management to choose a stream to transfer a data store job, and may transfer that job within pre-allocated disk space for multiple jobs. The system may trigger dynamic stream management processes based on a review of the storage window.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. In other words, the software and other modules described herein may be executed by a general-purpose computer, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor. Furthermore, aspects of the invention can be embodied in a special purpose computer or data processor that is specifically programmed, configured, or constructed to perform one or more of the computer-executable instructions explained in detail herein.

Software and other modules may be accessible via local memory, via a network, via a browser or other application in an ASP context, or via other means suitable for the purposes described herein. Examples of the technology can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

Examples of the technology may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

While certain aspects of the technology are presented below in certain claim forms, the inventors contemplate the various aspects of the technology in any number of claim forms. For example, while only one aspect of the technology is recited as a means-plus-function claim under 35 U.S.C. sec. 112, other aspects may likewise be embodied as a means-plus-function claim. Accordingly, the inventors reserve the right to add additional claims after filing the application to pursue such additional claim forms for other aspects of the technology.

The above detailed description of examples of the technology is not intended to be exhaustive or to limit the invention to the precise form disclosed above. For example, although certain types of storage operations have been described, the data protection scheduling system can dynamically schedule many types of operations. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The teachings of the technology provided herein can be applied to other systems, not necessarily the system described above. The elements and acts of the various embodiments described above can be combined to provide further examples. Any patents and applications and other references noted above, including any that may be listed in accompanying filing papers, are incorporated herein by reference. Aspects of the invention can be modified, if necessary, to employ the systems, functions, and concepts of the various references described above to provide yet further examples of the technology.

These and other changes can be made to the invention in light of the above Detailed Description. While the above description describes certain embodiments of the invention, and describes the best mode contemplated, no matter how detailed the above appears in text, the invention can be practiced in many ways. Details of the system and method for classifying and transferring information may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the technology under the claims. While certain aspects of the technology are presented below in certain claim forms, the inventors contemplate the various aspects of the technology in any number of claim forms. For example, while only one aspect of the technology is recited as stored in a computer memory, other aspects may likewise be stored in a computer memory. Accordingly, the inventors reserve the right to add additional claims after filing the application to pursue such additional claim forms for other aspects of the technology.

I claim:

1. A system comprising:
   one or more non-transitory computer-readable media having computer-executable instructions stored thereon; and
   one or more processors that, having executed at least some of the computer-executable instructions, configure the system to perform a plurality of operations comprising:

assigning a plurality of storage jobs to a storage window of time, which is programmed in the system for performing storage jobs;

completing some but not all of the plurality of storage jobs during the storage window, wherein among the plurality of storage jobs at least a first storage job was not performed during the storage window and remained to be performed after the storage window ended;

determining a start time for the first storage job, wherein the start time is determined at least in part based on predicting when a usage level of resources needed for the first storage job is expected to be below a threshold level of usage, wherein a predicted duration of the first storage job is less than a predicted duration of the usage level of the resources staying below the threshold level of usage;

based on the first storage job having not been performed during the storage window, initiating the first storage job at substantially the start time, which is outside the storage window to which, in the assigning, the plurality of storage jobs were assigned;

continuing to perform the first storage job, based at least in part on determining that the usage level of the resources needed for the first storage job is below the threshold level of usage; and based on determining that a completion percentage of the first storage job is above a completion threshold, continuing to perform the first storage job regardless of a priority associated with the first storage job.

2. The system of claim 1, wherein predicting when the usage level of resources needed for the first storage job is expected to be below the threshold level of usage, is based at least in part on one or more measures of usage of resources of the system during a historical time interval.

3. The system of claim 1, wherein determining the start time of the first storage job is based at least in part on a historical pattern of usage of resources of the system.

4. The system of claim 1, wherein the threshold level of usage used for determining the start time of the first storage job is based on the priority associated with the first storage job.

5. The system of claim 1, wherein the plurality of operations further comprises:

based on determining that the usage level of the resources needed for the first storage job is above the threshold level: stopping the first storage job, and after stopping the first storage job: associating a higher priority with the first storage job and lowering the threshold level, which is to be used for completing the first storage job at another time.

6. The system of claim 5, wherein the plurality of operations further comprises:

after stopping the first storage job, waiting to restart the first storage job until the usage level of the resources needed for the first storage job is below the threshold level as lowered for completing the first storage job.

7. The system of claim 1, wherein the plurality of operations further comprises:

after the first storage job has been initiated, preempting the first storage job for an other storage job, wherein the preempting includes: stopping the first storage job and initiating the other storage job based on determining that a second usage level of resources needed for the other storage job is below a second threshold level of usage, wherein the first storage job uses at least some of the resources needed by the other storage job.

8. The system of claim 7, wherein the plurality of operations further comprises:

monitoring the resources needed for the other storage job; and stopping the other storage job based on determining that the second usage level of the resources needed for the other storage job is above the second threshold level.

9. The system of claim 7, wherein the second threshold level of usage is lower than the threshold level of usage for the first storage job, and wherein the second threshold level of usage is associated with the other storage job and not with the first storage job.

10. The system of claim 7, wherein preempting the first storage job for the other storage job is further based on determining that the completion percentage of the first storage job being preempted is less than the completion threshold.

11. A system comprising:

one or more non-transitory computer-readable media having computer-executable instructions stored thereon; and one or more processors that, having executed at least some of the computer-executable instructions, configure the system to perform a plurality of operations comprising:

assigning a plurality of storage jobs to a storage window of time, which is programmed in the system for performing storage jobs;

completing some but not all of the plurality of storage jobs during the storage window, wherein among the plurality of storage jobs at least a first storage job was not performed during the storage window and remained to be performed after the storage window ended;

determining a start time for the first storage job, wherein the start time is based at least in part on predicting when a usage level of resources needed for the first storage job is expected to be below a threshold level of usage, wherein a predicted duration of the first storage job is less than a predicted duration of the usage level of the resources staying below the threshold level, and further wherein the start time is outside of the storage window;

initiating the first storage job at substantially the start time;

based on determining that the usage level of the resources needed for the first storage job is below the threshold level, continuing to perform the first storage job; and based on determining that the usage level of the resources needed for the first storage job is above the threshold level: stopping the first storage job, and after stopping the first storage job: assigning a higher priority to the first storage job and lowering the threshold level, which is to be used for completing the first storage job at another time.

12. The system of claim 11, wherein the plurality of operations further comprises:

after stopping the first storage job, waiting to restart the first storage job until the usage level of the resources needed for the first storage job is below the threshold level as lowered for completing the first storage job.

13. The system of claim 11, wherein predicting when the usage level of resources needed for the first storage job is expected to be below the threshold level of usage is based at least in part on one or more measures of usage of resources of the system during a historical time interval.

14. The system of claim 11, wherein determining the start time of the first storage job is based at least in part on a historical pattern of usage of resources of the system.

15. The system of claim 11, wherein the threshold level of usage used for determining the start time of the first storage job is based on a priority of the first storage job.

16. The system of claim 11, wherein the plurality of operations further comprises:

after the first storage job has been initiated, preempting the first storage job for another storage job, comprising: based on determining that a second usage level of resources needed for the other storage job is below a second threshold level of usage, wherein the first storage job uses at least some of the resources needed by the other storage job, stopping the first storage job and initiating the other storage job.

17. The system of claim 16, wherein the plurality of operations further comprises:

monitoring the resources needed for the other storage job; and based on determining that the second usage level of the resources needed for the other storage job is above the second threshold level: stopping the other storage job.

18. The system of claim 16, wherein the second threshold level of usage is lower than the threshold level of usage for the first storage job, and wherein preempting the first storage job for the other storage job is further based on determining that the other storage job has a higher priority than the first storage job.

19. The system of claim 18, wherein preempting the first storage job for the other storage job is further based on determining that a completion percentage of the first storage job being preempted is less than a completion threshold, and wherein the system is configured to refrain from preempting the first storage job for the other storage job if the completion percentage of the first storage job is above the completion threshold.

* * * * *